Aug. 4, 1959 — J. W. PUTT ET AL — 2,897,868
ANTI-SKID DEVICE FOR VEHICLES
Filed Nov. 4, 1958 — 3 Sheets-Sheet 1

INVENTOR
Joseph W. Putt
Lamar E. Chamberlain
BY
ATTORNEYS

Aug. 4, 1959  J. W. PUTT ET AL  2,897,868
ANTI-SKID DEVICE FOR VEHICLES
Filed Nov. 4, 1958  3 Sheets-Sheet 2
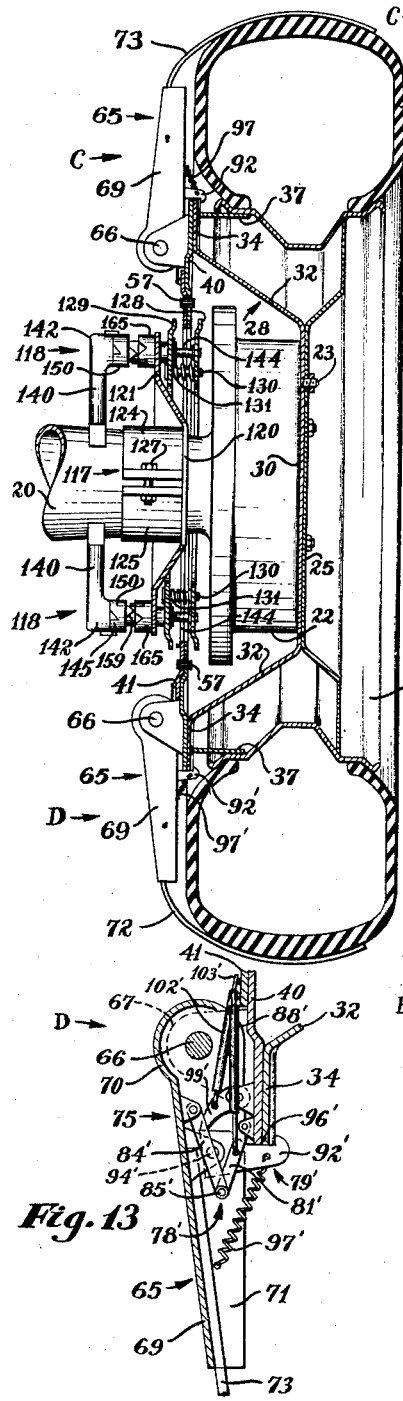
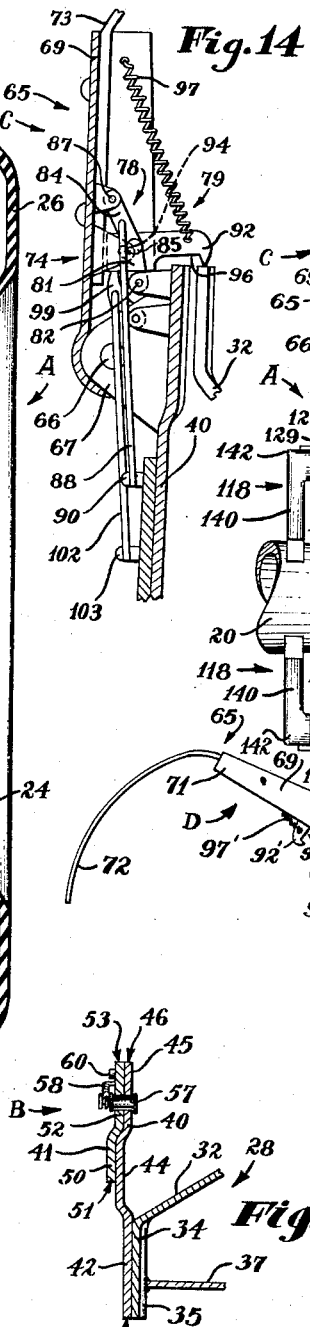
INVENTOR
Joseph W. Putt
Lamar E. Chamberlain
BY
ATTORNEYS

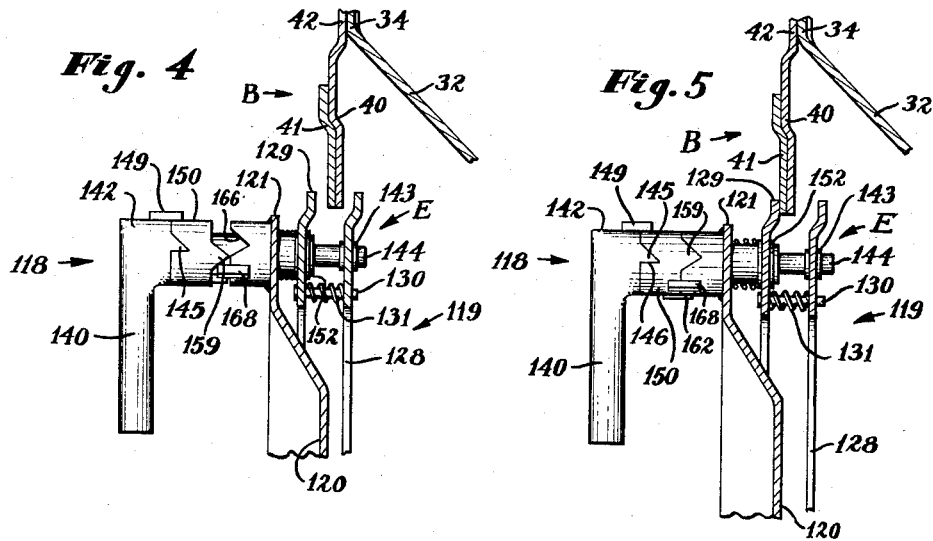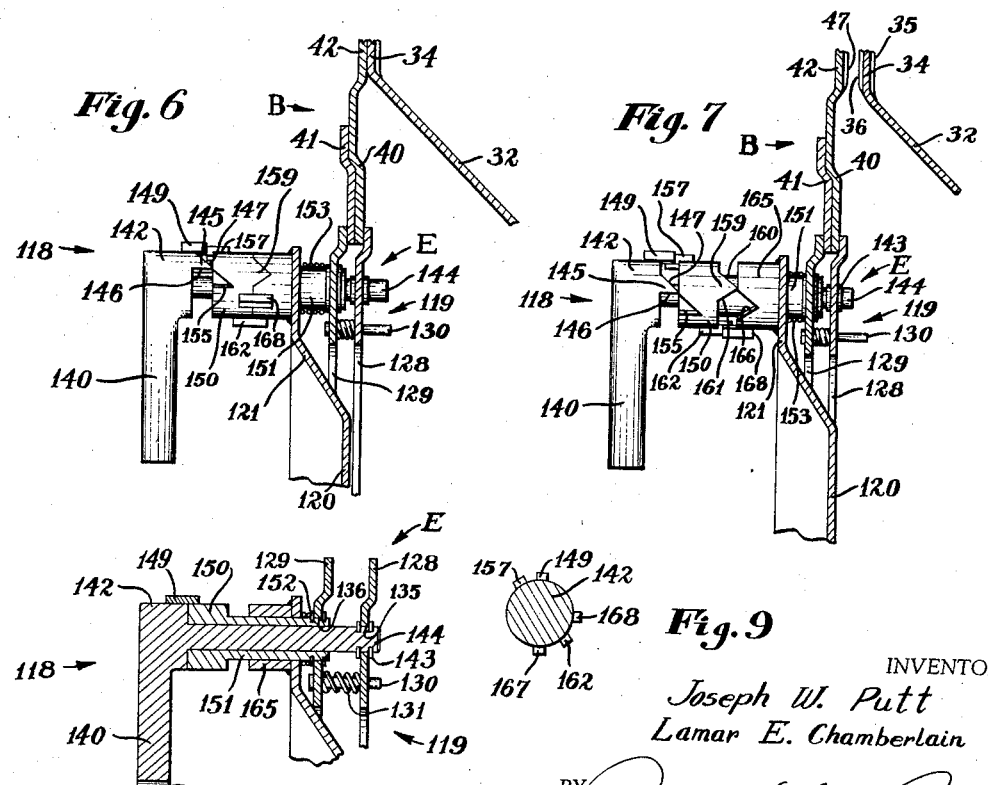

United States Patent Office 2,897,868
Patented Aug. 4, 1959

2,897,868
ANTI-SKID DEVICE FOR VEHICLES
Joseph W. Putt, Forty Fort, and Lamar E. Chamberlain, Hamburg, Pa.

Application November 4, 1958, Serial No. 771,867
11 Claims. (Cl. 152—216)

This invention relates to anti-skid devices that are particularly suitable for use on the driving or ground wheels of motor vehicles and trailers and which can be easily applied thereto, either at the factory or by the purchaser, with minor modification of the structure of the vehicle itself.

The primary object of this invention is the provision of anti-skid devices for vehicles that may be brought into "use" positions and actuated to a "non-use" position by the driver from a position within the vehicle itself. As a result of the driver's being able to quickly apply the anti-skid devices in a "use" or a "non-use" position, the non-skid elements or straps of the anti-skid devices will have a span of usefulness that far exceeds those of various other anti-skid devices now on the market as they can be quickly and easily applied and retracted as the vehicle travels alternately from slippery places to dry places on a highway.

A further object of this invention is the provision of anti-skid devices for vehicles wherein the various parts of the anti-skid devices move in a cooperative manner only during the application or removal interval during which time the anti-skid devices are being placed in their "use" or "non-use" position, and there is no relative movement of the parts after the anti-skid devices have been moved into either their "use" or "non-use" position.

A further object of this invention is the provision of an anti-skid device for vehicles wherein all of the anti-skid elements are indexed upon the anti-skid device so that certain of these elements will be positioned at the lowermost portion of the wheel of the vehicle when the anti-skid device is in its "non-use" position and wherein these indexed lowermost anti-skid elements have a greater degree of retraction from about the vehicle wheel than the remainder of the anti-skid elements. These lowermost indexed anti-skid elements, when in their fully retracted positions, are a substantial distance above the ground engaging portion of the vehicle wheel so that these elements will not contact the normal debris that is usually passed over by the vehicle, such as stones, branches, etc.

A further object of this invention is the provision of an anti-skid device for vehicles that can be constructed almost entirely of metal stampings, with a resultant low production cost and low sales price.

Other objects and advantages of this invention will be apparent during the course of the following detailed description, taken in connection with the accompanying drawings, forming a portion of this specification and in which drawings:

Fig. 2 is a transverse sectional view, partly in elevation and partly in vertical section, the view being taken transversely of the tire and adjacent parts, showing the invention in its "use" position with respect to the ground.

Fig. 3 is a transverse sectional view, partly in elevation and partly in vertical section, similar to Fig. 2, but showing the invention in its "non-use" position.

Figs. 4, 5, 6 and 7 are fragmentary sectional views showing the various positions of the control levers of the anti-skid device.

Fig. 8 is a longitudinal fragmentary sectional view taken through one of the control levers of the anti-skid device.

Fig. 9 is a transverse sectional view taken through one of the control levers of the anti-skid device.

Fig. 12 is an enlarged fragmentary view taken substantially on the line 12—12 of Fig. 1.

Fig. 13 is a fragmentary sectional view of one of the lowermost anti-skid elements in its "use" position.

Fig. 14 is a fragmentary sectional view of one of the uppermost anti-skid elements in its "non-use" position.

Figure 1:
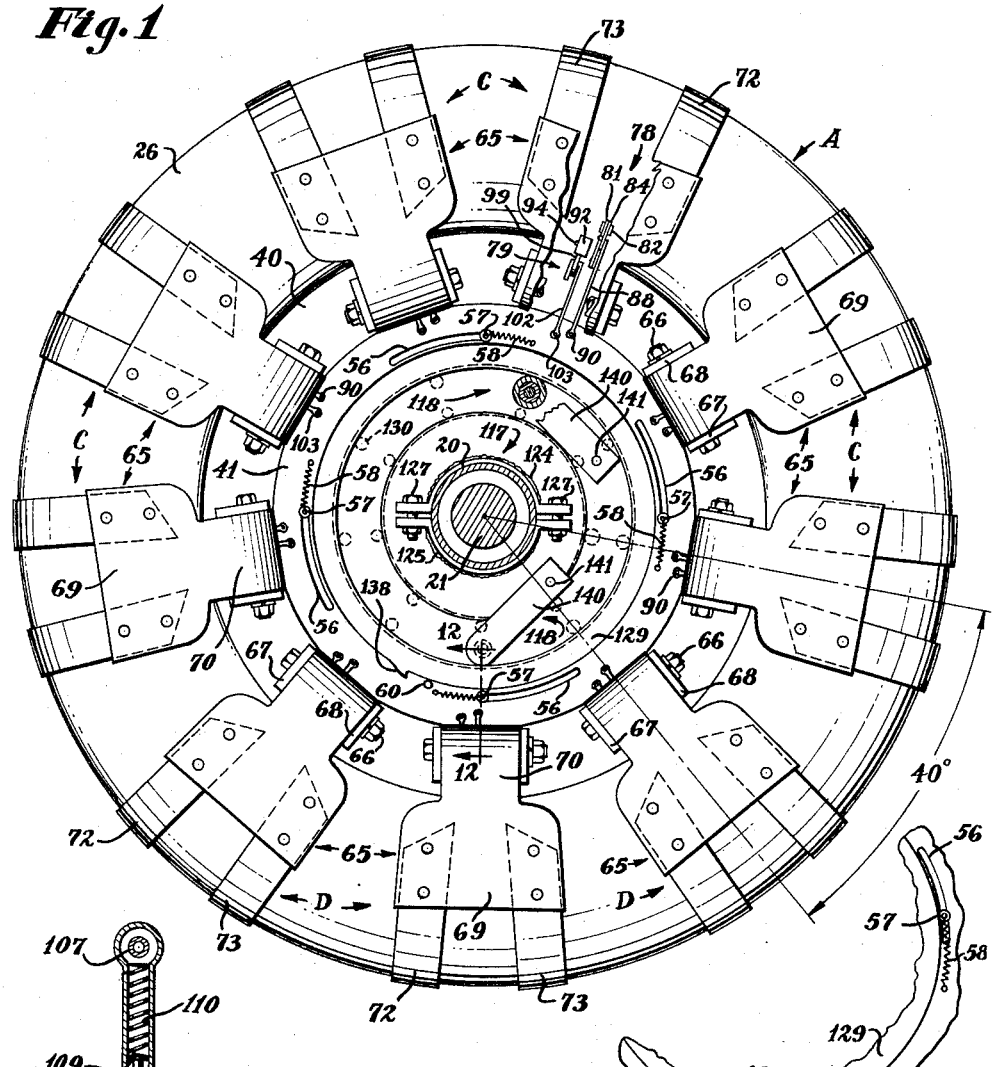
Fig. 1 is a transverse sectional view taken through the live axle of a motor vehicle showing our improved anti-skid device in its "use" position upon a vehicle wheel.

In the drawings, wherein for the purpose of illustration is shown a preferred embodiment of the invention, and wherein similar reference characters designate corresponding parts throughout the several views, the letter A may generally designate a vehicle wheel assembly; B the sliding double ring assembly which supports the upper anti-skid elements C and the lower anti-skid elements D; and E the clamping ring assembly that actuates the anti-skid elements.

The vehicle wheel assembly A disclosed is that of a conventional motor vehicle and is illustrated merely by way of example in order to clearly show the cooperation of the anti-skid device with the wheel structure. The vehicle wheel assembly A preferably comprises an axle housing 20 that is supported upon the vehicle in any conventional manner. A conventional brake drum and wheel hub assembly 22 is provided having lugs 23; a wheel rim 24 having a web 25 centrally thereof secured to the outermost portion of the wheel hub in the conventional manner such as by lugs 23; and any suitable tire 26, usually of the pneumatic type, supported upon the rim 24.

Secured to the rim 24 is the anti-skid element rotating means 28 that cooperates with the sliding double ring assembly B and rotates the anti-skid elements C and D in cooperation with the rotation of the wheel. The means 28 includes a central web portion 30 that is provided with conventional lug openings 31 that interfit about the lugs 23 and the web portion 30 is securely held in position between the interior portion of the web 25 of the rim 24 and the wheel hub assembly 22. Extending diagonally outwardly from the web portion 30 is a side portion 32 that terminates in a flange 34. This flange 34 is provided with a plurality of corrugations 35 which cooperate with similar corrugations upon the sliding double ring B, as will be subsequently described. As a support for the flange portion 34 there is provided a leg 37 that is fixedly secured at one end thereof to the undersurface of the flange 35 and is secured at the other end thereof to the rim 24. In the event that there is not sufficient clearance on the wheel for positioning of the web 30 intermediate the web 25 of the rim 24 and the wheel hub assembly 22 the web portion 30 and side portion 32 are eliminated, the leg 37 holding the flange 34 securely in position.

The sliding double ring assembly B preferably comprises a main outer ring 40 that supports the anti-skid elements C and D, and an inner operating ring 41.

The main outer ring 40 comprises an outer body portion 42, having an outer circumference 43, a raised central body portion 44 and an inner body portion 45 having an inner circumference 46. The outer body portion 42 is provided with a plurality of corrugations 47 that mesh with the corrugations 35 of the flange 34 of the vehicle wheel assembly A, in a manner to be subsequently described.

The operating ring 41 is provided with an outer body portion 50, having an outer circumference 51, and an inner body portion 52, having an inner circumference 53. As will be seen from Fig. 12 the inner circumferences 46 and 53 are in the same plane and the surface of the body portion of the operating ring 41 is designed to conform to that of the main outer ring 40.

The operating ring 41 is provided with a plurality of elongated slots 56 and the main outer ring 40 and the operating ring 41 are secured together by means of pins 57 that are fixedly secured at one end thereof to the main outer ring 40 and are slidably secured within the slots 56 of the operating ring 41 so that the operating ring 41 is arcuately rotatable with respect to the main outer ring 40 throughout the length of the slots 56. Springs 58 are secured at one end thereof to the pins 57 and at the other end thereof to the operating ring 41, these springs 58 acting to return the operating ring 41 to its "use" position when it is released from the clamping ring assembly E, as will be subsequently described. A stop 60 is provided adjacent the inner circumference 53 on the operating ring 41, for a purpose to be subsequently described.

Secured to the outermost portion of the main outer ring 40, outwardly of the outer circumference 51 of the main operating ring 41, are the anti-skid elements C and D. As these anti-skid elements are similar in construction, identical reference characters will be applied to the various parts of each, insofar as the construction is identical.

The anti-skid elements C and D generally comprise a strap hanger assembly 65 that is pivotally mounted upon an axle 66 supported upon the main outer ring 40 by the flanges 67 and 68. These strap hangers 65 generally comprise a main body portion 69 and a somewhat narrowed pivotal portion 70 with sides 71 being provided both upon the main body portion 69 and the narrowed pivotal portion 70 in order to prevent dirt for accumulating within the operating linkage. Secured to the main body portion 65, and extending outwardly therefrom are a pair of straps 72 and 73 that are adapted to pass about the ground engaging portion of the tire 26. It is obvious that a single strap may be provided instead of the dual straps 72 and 73, however, I have found that a greater gripping action will be effected by the provision of dual straps.

The anti-skid elements C and D are provided with actuating means 74 and 75, respectively, for the movement of the straps into a "use" and "non-use" position upon the rotation of the operating ring 41 with respect to the main outer ring 40.

Referring first to the actuating means 74 of the element C, the same generally comprises linkage means 78 for the actual movement of the strap hanger 65 into its "use" and "non-use" position, and a latch means 79 for locking the strap hangers into their "use" position upon the wheel.

The linkage means 78 preferably comprises a first arm 81, one end of which is pivotally secured to the main outer ring 40, as at 82, and the other end of which is pivotally secured to a second arm 84, as at 85. The other end of the arm 84 is pivotally secured to the strap hanger 65, as at 87. A shaft 88 is secured intermediate the length of the arm 84 and extends to a pivotal connection 90 on the operating ring 41.

The latch means 79 preferably comprises a latch member 92 that is pivotally secured at one end thereof to the strap hanger 65, as at 94. This latch member 92 is provided with a hook-like recess 96 that is adapted to interfit about the outermost edge 43 of the main outer ring 40 and the flange 34, locking the interfitting corrugations 35 and 47 in an interlocking relationship. A spring 97 is secured at one end thereof adjacent the outer end of the latch member 92 and at the other end thereof to the strap hanger 65, so that there is a constant spring action pulling the latch member 92 out of interlocking engagement with the main outer ring 40 and the flange 34. The latch member 92 is placed into its interlocking position by means of a cam member 99 that is pivotally secured at one end thereof to the main outer ring 40, the other end thereof being adapted to abut a portion of the latch member 92 at the other side of the pivot pin 94 from the hook-like recess 96. A shaft 102 is secured intermediate the cam member 99, the other end of the shaft 102 being pivotally secured at 103 to the operating ring 41.

The construction of the lowermost anti-skid elements D are substantially identical to those of the upper anti-skid elements C, with the following exceptions:

The linkage means 78' of the lower anti-skid elements D is provided with arms 81' and 84' that are longer than the arms 81 and 84 of the upper anti-skid elements C and the shaft 88' is secured intermediate the arm 81' so that a greater degree of throw is afforded the lower anti-skid elements D when the linkage is operated.

Figure 11:
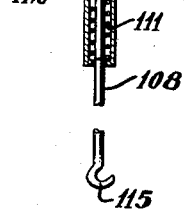
Fig. 11 is a longitudinal sectional view of one of the control rods of the lowermost anti-skid elements.

Whereas the shafts 88 and 102 of the elements C were rigid bars, the control rods 88' and 102' of the anti-skid elements D have double acting spring construction as illustrated in Fig. 11. This control rod construction includes an outer conduit 106 that has a pivotal connection 107 for securement to the operating ring 41, and houses a piston-like operating rod 108 therein. This piston-like operating rod 108 is provided with a flanged disc 109 at the end thereof within the conduit 106, this flange disc 109 bearing against an expansion spring 110 that is mounted within the conduit 106. A pin 112 is provided intermediate the length of the rod 108 and an expansion spring 111 is mounted within the conduit 106, at the other end thereof from the spring 110, and exerts an expansive force against the pin 112. These springs 110 and 111 have a like degree of expansive force and the rod 108 is held in equilibrium therebetween when there is no force exerted at either end of the control rod. The rod 108 extends outwardly from the conduit 106 and is provided with an eye-type member 115 at its outermost end for attachment to either the cam 99' or the link 81', dependent upon its connection.

The clamping ring assembly E preferably comprises an axle engaging frame portion 117, a pair of control levers 118, and a double clamping disc assembly 119.

The axle engaging frame 117 comprises a dish-shaped base member 120 having an outwardly extending flange 121 at its outermost edge and provided with a central opening 122 that is designed to interfit about the axle housing 20. Mounted upon the member 120 are upper and lower split ring members 124 and 125 that are clamped about the axle housing 20 by the bolt means 127. The innermost side edge of these split ring members 124 and 125 is welded to the disc 120 and the clamping action about the axle 20 is afforded by a distortion of the split rings 124 and 125.

Mounted upon the outwardly extending flange 121 of the disc 120 are the control means 118. These control means are identical and like reference characters have been applied to each.

The clamping means 119 preferably comprises an inner disc 128 and an outer disc 129, these discs being supported upon the control levers 118, in a manner to be subsequently described. These discs 128 and 129 are held in a spaced relationship by means of pins 130 that extend intermediate the discs and are provided with springs 131 therebetween, the springs 131 being of an expansive nature and tending to maintain the discs 128 and 129 in a spaced apart relationship. These pins 130 are placed adjacent the outer periphery of the discs 128 and 129 so that if the main outer ring 40 and operating ring 41 become displaced from their clamped position, as shown in Fig. 7, the innermost side edges 46 and 53 of these rings will ride upon the pins 130, maintaining these rings in their proper position so that they can be properly actuated when the device is moved into its "use" position. The disc 129 is provided with a cam-like member 138 at its outer periphery that cooperates with the stop 60 on the operating ring 41 in a manner to be subsequently described. The clamping ring 128 is provided with a plurality of openings 135 and the disc 129 is provided with a plurality of openings 136 for interconnection to the control means 118 in a manner to be subsequently described.

Each control lever 118 preferably includes a control arm 140, an opening 141 being provided at one end of the arm 140 for attachment of various operating mechanism, and is provided with a head 142 at the other end thereof, the head 142 having a shaft 144 secured to and projecting therefrom and secured at its outermost end to the disc 128 as by the clamping means 143. The portion of the head 142 adjacent the shaft 144 is provided with dual cogs 145, one side surface 146 of the cogs 145 being in a plane normal to the head 142 and the other side edge 147 of the cogs 145 being angled toward the head 142, the apex of the sides 146 and 147 being outwardly disposed from the head 142. Secured to one side of head 142 is a stop 149 for a purpose to be subsequently described.

Mounted upon the shaft 144 is an intermediate ring 150 to which is secured a tubular shaft portion 151 that extends along the shaft 144 and is secured at its outermost end to the disc 129 as by the clamping means 152. An expansion spring 153 is mounted about the tubular shaft 151 intermediate the flange 121 and the disc 129, the spring 153 acting to force the disc 129 away from the flange 121. The uppermost surface of the ring 150 is provided with a pair of recesses 155 having the same configurations as the cogs 145 of the head 142, and into which these cogs interfit. A stop 157 is provided on one side of the ring 150, extending above the upper surface thereof, adjacent the stop 149 of the head 142, which stops cooperate in a manner to be subsequently described. The lowermost edge of the ring 150 is provided with a pair of cogs 159 having angled side edges 160 and 161 that terminate in an apex outwardly from the ring 150. A second stop 162 is provided on one side of the ring 150, extending below the lower surface thereof, for a purpose to be subsequently described.

Mounted upon the tubular shaft 151 and secured to the flange 121 of the disc 120, is a lower ring 165. This lower ring is provided with dual recesses 166 that are of the same configuration as the cogs 159 and into which the cogs 159 are adapted to interfit. The ring 165 is provided with outwardly and upwardly extending stops 167 and 168, one each of which is located to either side of the stop 162 and which cooperate with the stop 162 in a manner to be subsequently described.

In actual operation the control arms 140 will be secured to flexible cables, attached through the openings 141, and these flexible cables will lead to a dash mounted lever assembly so that the entire unit may be operated from a position adjacent the driver's seat. The dash mounted lever assembly may be spring loaded to facilitate actuation.

Figure 10:
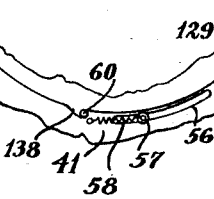
Fig. 10 is a fragmentary view of the operating ring of the anti-skid device when viewed from the same direction as Fig. 1, and showing this ring in its "non-use" position.

In the operation of the anti-skid device one of the devices is attached to each driving ground wheel of the vehicle, making certain that the indexing stop 60 is in the correct position so that it will index the lower anti-skid elements D in a proper position with respect to the ground, and the device is operated as follows:

Assuming that the vehicle is being operated over a dry terrain, and the anti-skid device is in its "non-use" position, the main outer ring 40 will be held in a spaced position from the flange 34 of the wheel assembly A so that the corrugations 47 and 35 are out of mesh, with the control means 118 in the position shown in Fig. 7. When the control means 118 is in this position the cogs 145 of the head 142 will be completely withdrawn from the recesses 155 in the intermediate ring 150, the stop 149 of the head 142 abutting against the stop 157 of the intermediate ring 150, the cogs 159 completely withdrawn from the recesses 166 of the lower ring 165, with the stop 162 of the intermediate ring 150 abutting against the stop 168 of the lower ring 165, thus holding the sliding double ring assembly B in the position shown in Fig. 7. When the sliding double ring assembly B is in this clamped position, the inner operating ring 41 will be held in a slightly rotated position with respect to the main outer ring 40, as shown in Fig. 10, with the springs 58 held in an expanded position, and with the cam-like member 138 of the disc 129 in cooperating contact with the stop 60. When the anti-skid device is in this position the sliding double ring assembly B is held in a fixed position by the clamping ring assembly E, and the vehicle wheel is free to rotate with respect thereto. In the event that the double ring assembly B becomes slightly vertically displaced within the clamping ring assembly E, it will remain supported in an operative position by the pins 130.

When it is desired to place the anti-skid device in its "use" position, the vehicle is stopped, the control means 118 are actuated by the movement of the flexible cables (not shown) connected to a dash mounted lever (not shown), the control means 118 first moving into a position as shown in Fig. 6, with the cog 159 of the intermediate ring 150 interfitting into the recess 166 of the lower ring 165, and the spring 153 urging the discs 128 and 129 toward the vehicle wheel, so that the main outer ring 42 is placed in abutment with the flange 34. When the control lever is in this position the corrugations 47 and 35 will be brought into an enmeshing position, the curved surface 36 of the enmeshing corrugations serving to properly align the flange 34 and the main outer ring 40, in the event that the outer ring 40 has become slightly displaced from its normal operating position, while held in an inoperative position by the clamping ring assembly E.

The control means 118 then moves to the position shown in Fig. 5, with the cog 145 of the head 142 interfitting within the recess 155 of the intermediate ring 150 and the cog 159 of the intermediate ring 150 interfitting within the recess 166 of the lower ring 165.

The control means 118 is then moved into a position as shown in Fig. 4, the cog 159 of the intermediate ring 150 moving out of the recess 166 of the lower ring 154 until the stop 162 of the intermediate ring 150 abuts the stop 167 of the lower ring 165, thus moving the disc 129 out of contact with the operating ring 41. While the control means is moving into this position the springs 58 will be exerting a pulling force upon the pins 57, and as soon as the stop 60 is released from contact with the cam-like member 138 the springs 58 will cause the operating ring 41 to rotate with respect to the main outer ring 40 until the pins 57 reach the end of the slots 56. This rotation of the operating ring 41 will actuate the means 74 and 75, placing the anti-skid elements C and D about the tire 26. In the actuation of the means 74, the shaft 88 will extend the linkage means 78 so that the strap 73 abuts against the outer periphery of the tire 26, and the shaft 102 abuts against one end of the catch 92, expanding the spring 97, and pushing the catch 92 over the flange 34, so that the flange 34 and the main outer ring 40 are held in an abutting position within the recess 96 of the catch 92.

The operation of the means 75 is substantially the same as that of the means 74, the control shaft 88' actuating the linkage means 78', placing the lower strap hangers about the outer periphery of the tire 26, and the shaft 102' actuating the catch 92' so that the flange 34 and main outer ring 40 are held in an enmeshing position within the recess 96' of the catch 92'. It will be seen, however, that when the wheel is in such a position that the lower anti-skid elements D are adjacent the ground engaging portion of the wheel, that these anti-skid elements will contact the ground and will not be positioned about the wheel until after the wheel has rotated a sufficient amount to clear this contact with the ground. This is the reason for the provision of the double acting spring construction that is utilized for these control shafts 88' and 102'. Therefore, when the device is initially placed into its "use" position, the anti-skid elements C will be securely clamped in position about the tire 26 and the lower anti-skid elements will be moved as far as their position with respect to the ground permits, the shaft 108 compressing the spring 111 of the control shafts 88' and 102', and as the vehicle wheel is rotated, upon movement of the vehicle, the spring 111 will return to its normal position in equilibrium with the spring 110, thus exerting a pulling force upon the shaft 108 and placing the anti-skid elements D in position upon the tire 26 as they are lifted from contact with the ground.

It will be obvious that the movement of the control means 118 moving the anti-skid elements into their "use" position is one continuous motion, and will not be a step-by-step movement as has been described above purely for the purposes of understanding the operation.

Whereas the anti-skid devices are preferably placed into a "use" position while the vehicle was in a stationary position, the wheel must be slightly rotated in order to actuate the anti-skid devices into their "non-use" position. As shown in Fig. 1 this rotation would be clockwise. In the actuation of the anti-skid devices into their "non-use" position, the control means 118 operate in their reverse position from that above described, the control means first moving from the position as shown in Fig. 4 to successive positions as shown in Figs. 5, 6 and 7. The control lever is spring loaded so that its operation will be continuous during the time that the lower anti-skid elements are properly indexed upon the wheel and the anti-skid elements moved into their "non-use" position. This spring loaded effect of the control means 118 first moves the discs 128 and 129 into a loosely fitting clamping relationship with respect to the main outer ring 40 and the operating ring 41, as shown in Fig. 6, permitting the main outer ring 40 and operating ring 41 to rotate, and upon rotation of the wheel the cam-like member 138 provided upon the disc 129 will contact the stop 60 upon the operating ring 41, stopping rotation of the operating ring 41 while the main outer ring 40 continues to rotate. This rotation of ring 40 with respect to ring 41 actuates the linkage means 74 and 75 which releases the straps 73 from about the tire 26. This operation of the linkage means 74 and 75 is just the reverse from that above described with respect to the actuation of these linkage means when applying the anti-skid device in its "use" position and further description is therefore unnecessary. The initial actuating of the linkage means 74 releases the latches 92 of the anti-skid elements C and retracts the straps of the elements C from about the tire 26. The initial actuation of the linkage means 75 will likewise act upon the anti-skid elements D, however, at this time one of the elements D is beneath the tire and cannot be released until the wheel is further rotated. The wheel is therefore further rotated until the element D clamped beneath the tire is released, whereupon the double acting spring construction of the control shafts 88' and 102' that has already been placed under stress by the rotation of the main outer ring 40 with respect to the operating ring 41, will spring this element into its freely retracted position. Upon the complete retraction of all of the anti-skid elements the spring loaded effect of the control cables actuating the control means 118 will cause the clamping means E to tightly grip the sliding double ring assembly B so that there is no further rotation of the main outer ring 40 with respect to the operating ring 41 and the control means 118 will move into the position as shown in Fig. 7, wherein the device is in its "non-use" position.

Various changes may be made to the form of the invention herein shown and described without departing from the spirit of the invention or the scope of the following claims.

We claim:

1. In an anti-skid device for mounting upon a ground wheel of a vehicle, said ground wheel including a wheel rim and a tire, and having a fixed axle member adjacent said ground wheel; the combination of a frame engaging said fixed axle member, clamping means movably supported by said frame, control means mounted upon said frame for cooperatively moving said clamping means, a sliding double ring assembly, means mounted upon said clamping means for supporting said sliding double ring assembly in juxtaposition with respect to said clamping means, a plurality of anti-skid elements mounted upon one of the rings of said sliding double ring assembly, anti-skid element actuating means operatively connected to each of said anti-skid elements, control mechanism for said anti-skid element actuating means operatively connected to the other ring of said sliding double ring assembly, cooperatively engaging means provided upon said clamping means and said last mentioned ring of said sliding double ring assembly for actuating said control mechanism, said clamping means and said sliding double ring assembly having operative interengagement for moving said anti-skid elements into respective positions of use and non-use, and means mounted upon said rim for cooperative engagement with said sliding double ring assembly for cooperative rotation of said sliding double ring assembly and said anti-skid elements.

2. The combination as specified in claim 1 wherein said clamping means comprises an inner disc and an outer disc, each of said discs being operatively mounted upon said control means, and spring means mounted intermediate said inner disc and said outer disc for holding said inner disc and said outer disc in a normally spaced relationship.

3. The combination as specified in claim 2 wherein said control means comprises a lower ring mounted upon said frame and having a centrally disposed passageway therethrough, the uppermost edge of said lower ring, opposite the point of attachment to said frame, being provided with an angular recess, and spaced stop means mounted on the outer periphery of said lower ring; an intermediate ring mounted adjacent to said lower ring, said intermediate ring having a tubular conduit extending downwardly through the passageway provided in said lower ring and outwardly of said frame, and means for securing said outer disc adjacent the endmost portion of said tubular conduit, a lug extending downwardly from said intermediate ring, adjacent said lower ring, adapted to cooperate with the recess provided in said lower ring, first stop means mounted on the outer periphery of said intermediate ring positioned to cooperate with said stop means of said lower ring, and second stop means mounted on the outer periphery of said intermediate ring at a point substantially diametrically opposed to said first stop means, said intermediate ring having a recess provided in the uppermost side thereof, at the side thereof opposite said lug; and a head ring mounted to the other side of said intermediate ring from said lower ring, said head ring having secured thereto a shaft portion extending downwardly through said tubular conduit and beyond the point of connection of said outer disc to said tubular conduit, and means for mounting said inner disc adjacent the outermost end of said shaft, a lug extending downwardly from the lowermost surface of said head ring, adjacent said intermediate ring, adapted to interfit and cooperate with the recess provided in said intermediate ring, stop means mounted on the outer periphery of said head ring and positioned for cooperation with said second stop means of said intermediate ring, and means for the actuation of said control means secured to said head ring.

4. The combination as specified in claim 3 wherein spring means is mounted upon said tubular conduit, intermediate said frame and said outer disc, said spring means normally urging said outer disc outwardly away from said frame.

5. The combination as specified in claim 1 wherein said sliding double ring assembly comprises a main outer ring and an inner operating ring, said main outer ring being of a greater diameter than said inner operating ring, said anti-skid elements being mounted upon said main outer ring outwardly of the outermost peripheral edge of said inner operating ring, and said control mechanism for said anti-skid element actuating means being operatively connected to said inner operating ring, pin means securing said main outer ring and said inner operating ring in juxtaposition to each other, said inner operating ring being provided with an elongated slot adjacent said pin means for providing a guide for relative rotating movement of said inner operating ring with respect to said main outer ring, and spring means secured to said inner operating ring and to said pin means for normally urging said pin means to one end of said slot.

6. The combination as specified in claim 1, wherein each of said anti-skid elements comprises a strap hanger assembly pivotally mounted upon one of the rings of said sliding double ring assembly, linkage means pivotally secured at one end thereof to said last mentioned ring and at the other end thereof to said strap hanger assembly, means pivotally secured to said strap hanger assembly for maintaining said means mounted upon said rim for cooperative engagement with said sliding double ring assembly in operative engagement with said sliding double ring assembly, cam means pivotally secured upon said last mentioned ring and positioned for interengagement with said last mentioned means, a first control shaft means secured at one end thereof to said linkage means and at the other thereof to the other ring of said double ring assembly, and a second control shaft means secured at one end thereof to said cam means, and at the other end thereof to said last mentioned ring of said double ring assembly.

7. The combination as specified in claim 6 wherein said means for maintaining said means mounted upon said rim for cooperative engagement with said sliding double ring assembly in operative engagement with said sliding double ring assembly comprises a latch member adapted to interfit over said last mentioned means and sliding double ring assembly and has attached thereto spring means for urging said latch member into engagement with said cam means.

8. The combination as specified in claim 7 wherein the linkage means for certain of said anti-skid elements have a greater throw than others, so that those of said anti-skid elements having linkage means of a greater throw will be displaced further from their use position, when in a non-use position.

9. The combination as specified in claim 8 wherein indexing means is provided for positioning the said anti-skid elements having linkage means with a greater degree of throw at the lowermost portion of the ground wheel when said anti-skid device is moved into a use or a non-use position, the control means for the actuation of said anti-skid elements having linkage means with a greater throw including double acting spring means, the actuation of the control means moving said anti-skid elements into a non-use position when at least one of said anti-skid elements having linkage means with the greatest throw is beneath the tire or moving said anti-skid elements into a use position when at least one of said anti-skid elements having linkage means with the greatest throw is prevented from moving into position about the wheel by the contact of the tire and the ground, and said double-acting spring means applying continuous actuating pressure to the linkage means so that upon the normal rotating movement of the anti-skid elements the double acting spring means will actuate the linkage means and complete the movement of the so hindered anti-skid elements into place.

10. The combination as specified in claim 1 wherein said cooperatively engaging means provided upon said clamping means and said last mentioned ring of said sliding double ring assembly for actuating said control mechanism comprises a stop secured to said last mentioned ring of said sliding double ring assembly and a cam means secured to said clamping means and positioned for engagement with said stop means, the point of engagement of the stop with the cam means being located so that certain of the anti-skid elements will always be positioned at the lowermost portion of the ground wheel, when the device is in its non-use position, the engagement of said stop means with said cam means acting to provide relative movement of one of the rings of said sliding double ring assembly with respect to the other.

11. In an anti-skid device for mounting upon a ground wheel of a vehicle, said ground wheel including a wheel rim and a tire, and having a fixed axle member adjacent said ground wheel, and provided with anti-skid element rotating means secured to said rim; the combination of a frame supported upon said fixed axle member, clamping means comprising inner and outer clamping discs, control means for said inner and outer clamping discs secured to said frame and supporting said discs upon said frame, means mounted upon said discs for maintaining said discs in a normally spaced apart relationship, a sliding double ring assembly comprising a main outer ring and an inner operating ring, said sliding double ring assembly being supported by said clamping means when the anti-skid device is in its non-use position, and supported out of contact with said clamping means when said anti-skid device is in its use position, said main outer ring and said inner operating ring having means secured thereto for maintaining said rings in a limited rotatable relationship with respect to each other, a plurality of anti-skid elements mounted upon said main outer ring, actuating means mounted upon each of said anti-skid elements, and control means for the actuation of said anti-skid element actuating means mounted upon and connected to said inner operating ring, the rotation of said main outer ring with respect to said inner operating ring acting to move the anti-skid elements into their desired position, a first means mounted upon said inner operating ring, and a second means mounted upon said outer clamping disc, said first and second means being positioned to cooperatively interact and provide for the rotation of the inner operating ring with respect to the main outer ring.

References Cited in the file of this patent

UNITED STATES PATENTS

| | | |
|---|---|---|
| 2,730,406 | Fitzgerald | Jan. 10, 1956 |
| 2,770,280 | Fries et al. | Nov. 13, 1956 |